United States Patent [19]

Yoshimura et al.

[11] 4,177,320

[45] Dec. 4, 1979

[54] ARTICLE COATED WITH FLUOROCARBON POLYMER

[75] Inventors: Tatsushiro Yoshimura, Takatsuki; Mutsusuke Namba, Settsu; Seisuke Suzue; Shigetake Tominaga, both of Ibaraki; Toshio Mizuno, Settsu; Nariyoshi Hayashida, Kyoto, all of Japan

[73] Assignee: Daikin Kogyo Co., Ltd., Osaka, Japan

[21] Appl. No.: 858,063

[22] Filed: Dec. 6, 1977

[30] Foreign Application Priority Data

Dec. 10, 1976 [JP] Japan ................................ 51/148989
Dec. 11, 1976 [JP] Japan ................................ 51/148937

[51] Int. Cl.[2] ........................ B32B 27/28; B32B 27/18; B32B 27/08

[52] U.S. Cl. .................................... 428/419; 428/421; 428/422

[58] Field of Search ........................ 428/419, 421, 422

[56] References Cited

U.S. PATENT DOCUMENTS

T952,005 11/1976 Attwood et al. ................ 428/419 X

FOREIGN PATENT DOCUMENTS 51-12053 4/1975 Japan ...................................... 106/387
51-31813 4/1975 Japan ...................................... 427/327

*Primary Examiner*—James R. Hoffman
*Attorney, Agent, or Firm*—Lane, Aitken & Ziems

[57] ABSTRACT

An article having on its substrate an undercoat including a polyarylene sulfide resin, a primer coat including a fluorocarbon polymer admixed with a binder on the undercoat, and a fluorocarbon polymer topcoat.

8 Claims, No Drawings

ARTICLE COATED WITH FLUOROCARBON POLYMER

BACKGROUND OF THE INVENTION

This invention relates to a novel finish for metals or ceramics.

It is well known that fluorocarbon polymers have excellent physical properties such as low abrasiveness, non-tackiness and high resistances to chemicals and heat and are used in a wide variety of fields such as domestic uses (such as in irons, frypans, etc.), the food industry, the electric industry, the machine industry and like industries. However, due to their inherent non-tackiness, fluorocarbon polymers are very poor in adhesiveness to all kinds of materials. Thus, this property makes it much more difficult to coat substrates with such polymers as compared with other known polymers. In order to overcome the above difficulty, there have been proposed several methods including a method in which a primer coat is applied onto a substrate prior to the coating of a fluorocarbon polymer topcoat, ensuring strong adhesion of the topcoat to the substrate through the primer coat, a method in which a substrate surface is chemically or physically roughened to facilitate adhesion of the fluorocarbon polymer to the roughened substrate by a so-called anchoring effect, and a method in which a fluorocarbon polymer per se is improved so as to enhance its adhesiveness to substrates.

Since known primer compositions generally contain strong acids or strong alkalis, they encounter several problems such as pollution of working environments upon preparation or during use of such primer composition and wastage of such compositions generally occurred in practical application.

In recent years, polyarylene sulfide resins (hereinafter referred to simply as PAS), typical of which is polyphenylene sulfide,

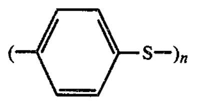

(hereinafter referred to simply as PPS), have attracted particular attention due to their characteristic properties of high resistance to heat and high affinity for fluorocarbon polymers. For example, in Japanese patent publication No. 51-31813/1976, there is proposed a method in which polyphenylene sulfide resin is sprayed over a blasted metal surface and baked to form a primer coat on which a fluorocarbon polymer topcoat is formed. Further, there are also known, from Japanese patent publication No. 12053/1976 and German Offenlegungsschrift No. 2152770, primer compositions containing polyphenylene sulfide and a fluorocarbon polymer as principal components particularly suitable for applying a fluorocarbon resin overlay coating.

In the former method in which a primer composition consisting essentially of particulate polyphenylene sulfide resin is used, it is essential that baking be effected at a relatively low temperature of 230°-320° C., in order to obtain satisfactory adhesion between a fluorocarbon polymer topcoat and the primer coat. However, such low temperature baking will not give a satisfactory adhesion between the substrate and the primer coat. When the PPS is baked at a high temperature to permit the primer to strongly adhere to the substrate, the resulting primer coat will become very poor in adhesion to the fluorocarbon polymer topcoat. Thus, the primer coat consisting essentially of PPS is not practical. Furthermore, though the PPS primer coat has a satisfactory hardness at a normal temperature, its hardness is low at a high temperature of, for example, about 200° C. Under such high temperature conditions the primer coat tends to be damaged with the attendant problem of lower resistance to scratch.

In the latter case where PPS admixed with a fluorocarbon polymer is used as a primer composition, adhesion between the primer and the fluorocarbon polymer topcoat is improved. However, adhesion between the primer coat and its metal substrate will be naturally lowered. Accordingly, in order to ensure a practical, usable adhesion between the primer coat and the metal substrate, it is essential to have the content of the fluorocarbon polymer below 20% by weight of the primer composition. However, such compositions do not yet provide satisfactory adhesion between a metal substrate and the primer coat or between the primer coat and the topcoat. Further, the addition of a fluorocarbon polymer to a primer composition is disadvantageous in that the final coated article is lowered in resistance to corrosion because of insufficient bonding between the substrate and primer coat.

SUMMARY OF THE INVENTION

It is, therefore, an object of the invention to provide a coated article which is devoid of the above-described defects.

The present invention provides an article or substrate having a first coating that contains a polyarylene sulfide resin, a second coating serving as a primer layer for fluorocarbon polymers, and a third layer coating of a fluorocarbon polymer topcoat. By this, strong adhesion between the respective contacting layers is ensured so that the coated article exhibits an excellent resistance to corrosion, excellent properties inherent to fluorocarbon polymers and improved hardness even at high temperatures.

The first layer preferably further includes a polyamideimide resin and/or a polyimide resin. The second layer may be any known fluorocarbon polymer-containing primer composition.

According to the present invention, there is further provided an article having a coating including a polyarylene sulfide resin and a polyamideimide resin and/or polyimide resin.

Other objects, features and advantages of the present invention will become apparent from the following detailed description of the invention.

DETAILED DESCRIPTION OF THE INVENTION

The first coating is an undercoat composition containing a polyarylene sulfide resin. The polyarylene sulfide resins useful in the present invention are polymers having a recurring unit of an aryl group and sulfur or a recurring unit composed of an aryl group and a group containing sulfur and oxygen. These polyarylene sulfide resins are particularly described in U.S. Pat. No. 3,354,129, the disclosure of which is hereby incorporated by reference. PAS is preferably used in combination with a polyamideimide resin (hereinafter referred to simply as PAI) and/or a polyimide resin (hereinafter referred to simply as PI), which are known to have relatively high resistance to heat.

PAI is characterized by having both amido radicals and imido radicals in its molecular structure thereof, and can be prepared, for example, by reaction of an aromatic diamine having an amido radical and an aromatic tetravalent carboxylic acid such as pyromellitic acid, by reaction of an aromatic trivalent carboxylic acid such as trimellitic anhydride and a diamine such as 4,4'-diaminodiphenyl ether, and by reaction of a dibasic acid having an aromatic imido ring and a diamine.

PI is a high molecular weight polymer having imido linkages and obtained by reaction, for example, of an aromatic tetravalent carboxylic anhydride such as pyromellitic anhydride and an aromatic diamine such as diaminodiphenyl ether.

PAS has recently attracted special interest for use as a heat-resistant and a corrosion-resistant coating material. This resin has a very high hardness of 4H–5H when determined by a pencil test at normal temperature but has a hardness below 2B at high temperatures of 180°–200° C. Even if this resin is coated onto cookware, the coating film becomes poor in resistance to scratch at high temperatures. Thus, the cookware coated with PAS alone has little practical utility. However, it has been found that when PAS is admixed with PAI and/or PI, the resulting film not only has the favorable characteristics inherent to PAS such as resistances to heat and corrosion and non-tackiness, but also can prevent the film hardness from being lowered even when employed under high temperature conditions. Moreover, the film exhibits a high resistance to abrasion.

The first, undercoat layer is overlaid with the second, primer layer. This primer layer may be any primer composition which exhibit good affinity both for the first layer and for the third, fluorocarbon polymer topcoat layer. The primer composition useful in the present invention may be a dispersion containing a fluorocarbon and a binder having the above-mentioned affinity. Various kinds of primer compositions which are commercially available as primers for fluorocarbon polymers may be used for the purpose of the present invention. Illustrative of the binders usable in the invention are, (a) chromic acid, (b) organic chelate compounds of transition metals of group IV of the Periodic table such as titanium, zirconium, etc., (c) synthetic resins other than fluorocarbon polymers which have miscibility with the fluorocarbon polymers and are stable at a temperature of 150° C. or more, such as PAS, PAI and PI, (d) mixtures of inorganic oxides and phosphoric acid, (e) lithium, potassium, sodium or other alkali silicates, (f) amine silicates, and (g) colloidal silica. All of these materials are known to be used as a component of primers for fluorocarbon polymers.

The primer layer is then covered with the third, fluorocarbon polymer topcoat layer. The fluorocarbon polymers useful for this purpose are conventional including, for example, polytetrafluoroethylene (PTFE), copolymers of tetrafluoroethylene and hexafluoropropylene, chlorotrifluoroethylene, perfluoroalkyltrifluorovinyl ether ($R_fOCFCF_2$) and the like, polychlorotrifluoroethylene and mixtures thereof. The fluorocarbon polymer may be used in any form such as powder, an aqueous dispersion obtained by an emulsion polymerization of a fluorocarbon monomer, a dispersion obtained by dispersing fluorocarbon polymer powder in an aqueous medium, an organosol, or an organosol-in-water emulsion. These fluorocarbon polymers of various forms are commercially available as fluorocarbon polymer topcoat compositions and any of them may be suitably used for the purpose of this invention.

A variety of solid materials such as iron, aluminum, stainless steel, various kinds of alloys, ceramics, etc., are usable as a substrate to be coated. The surface of the substrate is generally treated to make it rough so as to facilitate adhesion of the first layer or coating.

According to the invention, the undercoat film containing PAS, with or without being admixed with PAI and/or PI is first formed on the surface of the substrate. With an undercoat containing PAS alone, a fine powder of PAS having a size of about 0.5–50μ may be applied, as it is, onto the substrate by any powder coating method. Alternatively, the PAS powder may be dispersed in an aqueous or organic medium using auxiliaries such as a surface active agent, which is then applied onto the substrate in any known way and dried.

The PAS applied to the substrate is then baked at a relatively high temperature of about 330°–400° C. to cause the applied PAS to strongly adhere to the substrate. Since a fluorocarbon polymer topcoat composition is not directly applied onto the PAS layer in this practice of the invention, the PAS can be baked at such a relatively high temperature.

As described above, PAS is preferred to be mixed with PAI and/or PI, to give not only strongly adhesion to the substrate, but also far improved film hardness and resistance to abrasion under high temperature conditions. The mixing ratio of PAS to PAI and/or PI is not critical. However, if the PAI and/or PI content is too small, the hardness and abrasion resistance of the obtained film is not satisfactory. Too large a content is unfavorable in view of the lowered corrosion resistance of the film. It has been found that the weight ratio of PAS to PAI and/or PI is most suited to be within a range of 20/1 to 1/2. The undercoat composition including PAS and PAI and/or PI may be used in the form of a uniformly mixed powder or a solution or dispersion in a liquid medium. Any of known coating methods may be used for the application of the composition.

To ensure formation of a uniform film of the undercoat composition in the form of dispersion or solution, it is preferred that the solution or dispersion contain a solvent capable of dissolving PAI and/or PI under film-forming conditions. Examples of such solvents are N-methylpyrrolidone, cresol, phenol, naphtha, dimethylformamide, dimethylacetoamide, benzonitrile, methylglycol acetate, methyl ethyl ketone, 2-nitropropane, ethylglycol acetate, ethyl acetate, xylene, toluene, methyl isobutyl ketone, and mixtures thereof including, for example, mixtures of N-methylpyrrolidone and toluene, ethyl acetate, butyl glycol, dioxane, etc.

The undercoat composition may further include a surface active agent such as an anionic active agent or a non-ionic active agent; a pigment such as an oxide of titanium or iron; a viscosity-controlling agent or a thickner such as methyl cellulose or ethyl cellulose; a levelling agent such as a fluorinated alkylcarboxylic acid or sulfonic acid; a film hardener such as metal powder or metal compound; a wetting agent such as an organic solvent, and the like. As described hereinbefore, the undercoat composition is applied to the substrate surface by any known method such as spraying, dipping, flow coating and the like. Where the composition contains a volatile matter, such component is evaporated by heating. Then, the applied composition is baked at a relatively high temperature of about 330°–400° C. to cause it to strongly adhere to the substrate.

The primer coat for the fluorocarbon resin is next formed on the undercoat layer as the second layer. The primer composition is applied also by conventional methods such as spraying, dipping, flow coating and the like, followed by drying and baking. The drying is conducted at a temperature of from a normal temperature to about 100° C. This is true of any drying treatment for the first to third layers. If the applied primer composition is directly baked, rapid gasification of the liquid medium by evaporation will undesirably cause occurrence of cracks or pinholes on the film surface. This will be completely avoided by the drying treatment as well known in the art. The baking temperature for the primer layer varies depending on the primer composition but is generally up to 400° C.

The present invention is based on an important finding that the undercoat layer composed of PAS, with or without being admixed with PAI, and/or PI has strong adhesion to the primer layer for fluorocarbon resin. As will be seen from the description that follows, the adhesion of the primer layer to the first layer and also to the third layer are very high.

The fluorocarbon polymer topcoat composition to be applied to form the third layer is also applied in any conventional way such as spraying, electrostatic coating, flow coating, and the like. The optimum baking temperature is dependent on the type of the fluorocarbon polymer employed as well known to those skilled in the art. For example, with polytetrafluoroethylene, a copolymer of tetrafluoroethylene and hexafluoropropylene, a copolymer of tetrafluoroethylene and chlorotrifluoroethylene, a copolymer of tetrafluoroethylene and perfluoroalkyltrifluorovinyl ether, etc., the baking temperature is generally in the range of 340°–420° C., preferably 360°–400° C. With polychlorotrifluoroethylene and copolymers containing chlorotrifluoroethylene as a principal component, the baking is performed at about 230° to 300° C., preferably 240° to 270° C.

The article of the invention is characterized by having strong adhesion between the substrate and the fluorocarbon polymer topcoat. The adhesion is generally shown in terms of adhesion strength. The three-layer coating according to the invention is revealed to have far improved adhesion strength over known counterparts, as reported in Example 1 which follows. For instance, in the case of an article having a known chromic acid primer, the adhesion strength is found to be about 2.0 kg/cm. With a primer of a fluorocarbon polymer mixed with PPS (such as disclosed in Japanese patent publication No. 12053/1976) or a primer using PPS alone (such as disclosed in Japanese patent publication No. 31813/1976), the adhesion strength is in the range of 1.0–1.5 kg/cm. The adhesion strength of the three-layer coating according to the invention is found to be as high as 2.5–3.2 kg/cm.

The coated article of the invention can almost completely withstand a corrosive atmosphere of either a liquid or a gas, showing the excellent shut-off properties of the coat. Accordingly, if the film surface is brought into contact with a corrosive material, the material can not reach the substrate surface, so that a metal or other material constituting the substrate can be completely protected. The complete protection of a metal substrate from a corrosive material can not be expected from coating films obtained by conventional methods wherein a primer is directly applied to a metal surface on which a topcoat is then applied. As a result, the prior art film is often blistered, the blisters gradually increase and finally, the film completely separate from the metal substrate. This disadvantage can be completely overcome by the present invention as described hereinbefore. The protecting effect of the coating according to the invention is believed to be attributable in large measure to the undercoat layer. In some cases, a fluorocarbon polymer-containing primer coat does not require a topcoat applied thereover, depending on the purpose in end use. In this regard it is also noted that the topcoat may be omitted also from the coated article of the present invention. This will be understood in view of the fact that the undercoat layer made of PAS or a mixture of PAS and PAI and/or PI contributes largely to the desirable properties of the article as described hereinabove.

The following examples will further illustrate the present invention, in which percentages are by weight unless otherwise defined.

EXAMPLE 1

Preparation of PPS Dispersion

| | |
|---|---|
| PPS powder obtained by pulverizing commercially available PPS in a high speed impact mill to have an average size of 10 μ | 800 g |
| Sodium lauryl sulfate | 50 g |
| Polyvinyl alcohol | 30 g |
| Ion exchanged water | 1000 g |

These components were mixed in a ball mill for 24 hours to obtain a PPS dispersion.

Preparation of PI Dispersion

| | |
|---|---|
| PI powder obtained by pulverizing PI ("Kerimid 604-1000", product of Rhone-Pouleng, France) in the same manner as in the case of PPS, with an average particle size of 10 μ | 300 g |
| Sodium lauryl sulfate | 50 g |
| N-methylpyrrolidone | 1000 g |
| Polyvinyl alcohol | 30 g |
| Ion exchanged water | 1000 g |

These components were mixed and pulverized in a ball mill for 24 hours to obtain a PI dispersion.

The thus obtained PPS dispersion and PI dispersion were mixed in a container equipped with an agitator to give undercoat compositions for the first layer having the various mixing ratios indicated in Table 1.

An aqueous dispersion of polytetrafluoroethylene powder with an average size of 0.2μ was blended with the PI dispersion prepared above in a PTFE/PI weight ratio of 3/1 and gently agitated to give a primer composition for the second layer.

200 mm×200 mm×1 mm iron plates were each sand blasted to roughen their surfaces and then cleaned with a blast of compressed air to give substrates to be coated. Each of the undercoat compositions was applied onto the substrate by a spraying method so as to have a thickness, after baking, of about 20μ, dried for 10 minutes in an infrared ray dryer, and then baked at 390° C. for 20 minutes in a baking furnace. After cooling, the primer composition was applied onto the first layer in the same manner and conditions as in the case of the first layer to form a second layer.

Thereafter, a commercially available polytetrafluoroethylene topcoat composition (produced by Daikin Kogyo Co., Ltd., trademark of Polyflon Enamel EK-4108-GY, solid content of 41%, gray) was further applied in a baked thickness of about 25μ, and dried and baked in the same manner as in the case of the first layer, thereby forming a topcoat strongly adhered to the second layer. After cooling, the thus produced coated articles were subjected to the following tests to measure the physical properties of their coated film. The test results are shown in Table 1.

| | |
|---|---|
| Pencil Hardness Test: | In accordance with Japanese Industrial Standard K-6894. |
| Brine Spray Test: | In accordance with Japanese Industrial Standard Z-2371. |
| Heat-resistant Test: | Test pieces were heated for predetermined periods of time in electric furnaces maintained at 300° C. and 390° C., respectively, and then withdrawn from the furnaces to cool, followed by the pencil hardness test according to JIS K-6894. |
| Peeling Test: | An iron plate treated to make its surface rough was coated over half of the area of its surface with the undercoat composition to form a fused first layer and then with the primer composition to form a second fused layer. Then the topcoat composition was applied to the other half of the plate as well as to the second layer, followed by drying and baking. The part of the topcoat not applied over the primer layer was manually peeled off. Then, the topcoat layer was peeled off at a rate of 20 mm/min at an angle of 180 degrees by means of an automatic recording tensile tester to determine the adhesion strength expressed in terms of kg/cm. |

EXAMPLE 2

| | |
|---|---|
| PAI solution (product of Hitachi Chem. Co., Ltd., "HI-400", xylene solution with a resin content of about 25%) | 1500 g |
| Sodium lauryl sulfate | 30 g |
| Surface active agent ("Triton X-100", product of Rohm & Haas Ltd.) | 30 g |
| De-ionized water | 1200 g |

These components were mixed and pulverized in a ball mill for 100 hours to give a PAI dispersion. The PAI dispersion and the PPS dispersion obtained in Example 1 were mixed in the different ratios indicated in Table 2, in a container equipped with an agitator to give undercoat compositions.

| | |
|---|---|
| PAI dispersion mentioned above | 100 g |
| Aqueous PTFE dispersion used in Example 1 | 100 g |
| Aqueous 2% methyl cellulose solution | 10 g |

These components were mixed and agitated to give a primer composition.

Then, iron plates which had been surface-treated in the same manner as in Example 1 were provided with the undercoat compositions to have a film thickness, after baking, of about 20μ dried, baked and cooled. Then, the primer composition was applied onto the undercoat layer in the same manner as with the undercoat (thickness after baking of 10μ). A PTFE topcoat composition, "Polyflon Enamel EK-4183GB" (product of Daikin Kogyo Co., Ltd., with a solids content of 41%, grayish brown color) was then applied onto the primer layer in the same manner as with the primer to a film thickness after baking of 20μ. Drying, baking and cooling of the undercoat, primer and topcoat were effected under the same conditions as in Example 1. For comparative purpose, an iron plate was directly primed with the primer composition and then overcoated with the topcoat composition, under the same conditions as above. The resulting coated articles were subjected to a series of tests. The results were as shown in Table 2.

EXAMPLE 3

| | |
|---|---|
| PAI dispersion prepared in Example 2 | 1000 g |
| Aqueous dispersion of a tetrafluoroethylene hexafluoropropylene copolymer, polymer content of 55% ("Neoflon ND-1", product of Daikin Kogyo Co., Ltd.) | 1000 g |
| Aqueous 2% polyvinyl alcohol solution | 1000 g |

These components were mixed with agitation to obtain a primer composition. Then, Example 2 was repeated using this composition for the formation of a second layer, and the aqueous copolymer dispersion "Neoflon ND-1" as a topcoat composition. Mixing ratios of PPS to PAI in the undercoat were as indicated in Table 3. The resulting coated articles were found to have the properties as shown in Table 3. The comparative sample in Table 3 had a first layer of the primer composition directly provided on an iron substrate, overlaid with the topcoat composition.

EXAMPLE 4

Similar to Example 2, an iron plate which had been sand blasted and cleaned was undercoated with the PPS and PAI dispersion in the same manner as in Example 2 to form a first layer with a thickness of 15μ after baking. Then, the following primer compositions (a) and (b) were separately applied in the same manner as in Example 2 to form a second layer with a thickness after baking of 10μ. Composition (a): As described in Japanese laid-open publication No. 150735/1975, the following components were uniformly mixed to prepare a primer composition containing a titanium chelated compound.

| | |
|---|---|
| Acetylacetone chelated compound of tetrabutyl titanate | 1000 g |
| Aqueous PTFE dispersion (resin content 60%) | 500 g |
| Aqueous 20% titanium oxide dispersion (obtained by mixing titanium oxide with sodium lauryl sulfate in an amount of 30% of the titanium oxide in de-ionized water in a ball mill) | 150 g |

Composition (b): The following components were uniformly mixed.

| | |
|---|---|
| Aqueous 30% lithium polysilicate, product of Nissan Chem. Co., Ltd. | 150 g |
| Aqueous PTFE dispersion (resin content of 60%) | 500 g |
| Aqueous powdered mica dispersion (obtained by ball-milling 200 g of mica and 20 g of "Triton X-100" in 800 g of de-ionized water for 50 hours) | 300 g |

A PTFE topcoat composition, "Polyflon Enamel EX-4108GY" product of Daikin Kogyo Co., Ltd., was applied onto the second, primer layer in the same manner as in Example 2 to give a film thickness of 20μ after baking. Thus, a three-layer coating was obtained. For comparative purpose, the composition (a) and (b) were each directly applied onto an iron plate as primer layers, on which the above-indicated topcoat composition was applied in the same manner as described above to give a two-layer coating.

The test results are shown in Table 4.

EXAMPLE 5

PPS ("Ryton V-1" of Phillips Petroleum Co., U.S.A) which had been finely powdered to an average particle size of about 10μ, and PAI ("HI-400" produced by Hitachi Chem. Co., Ltd., in the form of an xylene solution having a resin content of about 25%) were mixed with each other in the ratios indicated in Table 5. The mixtures were agitated in a high speed agitator for about 1 hour to give film-forming compositions. The compositions were each sprayed over an aluminum plate having a sand blasted surface to give a film thickness, after baking, ranging from 15 to 20μ. Then, the applied composition was dried in an infrared ray dryer to sufficiently remove the volatile matters, and baked for 20 minutes in an electric heater maintained at 370° C. After cooling, the resulting coated plates were subjected to brine spray and pencil hardness tests with the results shown in Table 5.

Table 1

| Weight ratio of PPS/PI in undercoat composition | Physical properties | | | | | |
|---|---|---|---|---|---|---|
| | Pencil hardness | | Heat resistance | | Brine spray test | Adhesion strength |
| | 23° C. | 200° C. | 300° C. × 30 hrs | 390° C. × 10 hrs | (200 hrs) | (kg/cm) |
| 100/0 | 2H | 2B | 2H | H | no blister | 2.5 |
| 100/5 | 2H | HB | 2H | H | " | 2.7 |
| 100/10 | 2H | F | 2H | H | " | 3.0 |
| 100/30 | 2H | H | 2H | H | " | 3.4 |
| 100/50 | 2H | H | 2H | HB | " | 3.6 |
| 0/100 | 3H | 2H | 2H | B | slightly blistered | 3.9 |

Table 2

| Weight ratio of PPS/PI in undercoat composition | Physical properties | | | | | |
|---|---|---|---|---|---|---|
| | Pencil hardness | | Heat resistance | | Brine spray test | Adhesion strength |
| | 23° C. | 200° C. | 300° C. × 30 hrs | 390° C. × 10 hrs | (200 hrs) | (kg/cm) |
| 100/0 | H | <2B | H | H | no blister | 2.5 |
| 100/5 | H | HB | H | F | " | 2.8 |
| 100/10 | 2H | H | 2H | F | " | 3.2 |
| 100/30 | 2H | H | 2H | HB | " | 3.3 |
| 100/50 | 2H | H | 2H | HB | " | 3.7 |
| Comparative Example | H | F | B | <2B | largely blistered | 2.2 |

Table 3

| Weight ratio of PPS/PAI in undercoat composition | Physical properties | | | |
|---|---|---|---|---|
| | Pencil hardness 23° C. | Heat resistance 390° C. × 10 hrs | Brine spray test (200 hrs) | Adhesion strength (kg/cm) |
| 100/0 | H | H | no blister | 2.9 |
| 100/10 | H | F | " | 3.4 |
| 100/50 | H | HB | " | 3.8 |
| 0/100 | 2H | HB | slightly blistered | 4.2 |
| Comparative Example | H | H | largely blistered | 2.5 |

Table 4

| | Coating Composition | | Physical properties | | | |
|---|---|---|---|---|---|---|
| | First layer | Second layer | Pencil hardness room temperature | Heat resistance 39° C. × 20 hrs | Brine spray test (200 hrs) | Adhesion strength (kg/cm) |
| Example | PPS/PAI (100/10) | titanium chelate | H | H | no blister | 2.5 |

Table 4-continued

| | Coating Composition | | Physical properties | | | |
|---|---|---|---|---|---|---|
| | First layer | Second layer | Pencil hardness room temperature | Heat resistance 39° C. × 20 hrs | Brine spray test (200 hrs) | Adhesion strength (kg/cm) |
| | dispersion | composition lithium polysilicate composition | H | H | no blister | 2.3 |
| Comparative Example | titanium chelate composition | polyflon EK-4108GY | H | <2B | largely blistered | 2.0 |
| | lithium polysilicate composition | | H | <2B | largely blistered | 1.8 |

Table 5

| | | Physical properties | | |
|---|---|---|---|---|
| | | Pencil hardness (23° C.) | | |
| Test No. | Weight ratio of PPS/PAI | room temp. | 200° C. | Brine spray test (24 hrs) |
| 1 | 1/6 | 3H | 2H | blistered |
| 2 | 1/3 | 3H | 2H | slightly blistered |
| 3 | 1/1 | 4H | 2H | no blister |
| 4 | 5/1 | 5H | H | " |
| 5 | 20/1 | 5H | H | " |
| 6 | 50/1 | 5H | F | " |
| 7 | 100/1 | 5H | 2B | " |

What is claimed is:

1. A coated article comprising:

a substrate;

an undercoat formed over said substrate and containing a polyarylene sulfide resin;

a primer coat formed over said undercoat and containing a binder and a fluorocarbon polymer; and a fluorocarbon polymer topcoat.

2. The article according to claim 1 wherein the undercoat further contains at least one imido-containing resin selected from the group consisting of polyamideimide resins and polyimide resins.

3. The article according to claim 2 wherein the ratio by weight of the polyarylene sulfide resin to the imido-containing resin ranges from 20/1 to 1/2.

4. The article according to claim 1 wherein the undercoat is formed by applying an undercoat composition comprising a polyarylene sulfide resin onto the substrate, drying the applied composition and baking the dried composition at a temperature of 330° to 400° C.

5. The article according to claim 1 wherein said fluorocarbon polymer topcoat consists essentially of a fluorocarbon polymer selected from the group consisting of homopolymers of tetrafluoroethylene and copolymers of tetrafluoroethylene.

6. The article according to claim 1 wherein said polyarylene sulfide resin is a polyphenylene sulfide resin.

7. The article according to claim 1 wherein said fluorocarbon polymer-containing primer coat includes a binder selected from the group consisting of chromic acid, organic chelate compounds of transition metals of group IV, synthetic resins other than fluorocarbon polymers, which have miscibility with the fluorocarbon polymers and are stable at a temperature of at least 150° C., mixtures of inorganic oxides and phosphoric acid, alkali metal silicates, amine silicates, and colloidal silica.

8. The article of claim 1 wherein said binder is selected from the group consisting of:

(a) chromic acid;

(b) organic chelate compounds of the transition metals of group IV of the periodic table;

(c) synthetic resins other than fluorocarbon polymers which are miscible with said fluorocarbon polymer and which are stable at a temperature of 150° C. or more;

(d) mixtures of inorganic oxides and phosphoric acid;

(e) alkali silicates;

(f) amine silicates; and (g) colloidal silica.

* * * * *

UNITED STATES PATENT AND TRADEMARK OFFICE
CERTIFICATE OF CORRECTION

PATENT NO. : 4,177,320
DATED : December 4, 1979
INVENTOR(S) : Tatsushiro Yoshimura et al It is certified that error appears in the above-identified patent and that said Letters Patent are hereby corrected as shown below:

Column 2, line 36, delete "layer".

Column 3, line 4, delete "thereof".

Signed and Sealed this

*First* Day of *April 1980*

[SEAL]

*Attest:*

SIDNEY A. DIAMOND

*Attesting Officer* *Commissioner of Patents and Trademarks*